United States Patent [19]

Richards et al.

[11] Patent Number: 5,400,360
[45] Date of Patent: Mar. 21, 1995

[54] REPEATER FOR A DIGITAL CONTROL SYSTEM

[75] Inventors: Alan W. Richards, Lynchburg; Kenneth R. Talbott, Gretna; Paul R. Smith, Lynchburg, all of Va.

[73] Assignee: Limitorque Corporation, Lynchburg, Va.

[21] Appl. No.: 35,675

[22] Filed: Mar. 23, 1993

[51] Int. Cl.$^6$ .................... H03K 11/00; H04L 25/60; H04L 25/64

[52] U.S. Cl. .................................. 375/214; 375/211; 455/7; 455/9

[58] Field of Search .................. 375/3, 3.1, 4; 455/7, 455/9, 10, 14; 178/70 R; 379/338, 340

[56] References Cited

U.S. PATENT DOCUMENTS

| | | |
|---|---|---|
| 4,233,589 | 11/1980 | Rawson et al. . |
| 4,475,209 | 10/1984 | Udren . |
| 4,484,336 | 11/1984 | Catchpole et al. . |
| 4,500,990 | 2/1985 | Akashi . |
| 4,519,083 | 5/1985 | Hanson . |
| 4,535,450 | 8/1985 | Tan . |
| 4,570,220 | 2/1986 | Tetrick et al. . |
| 4,577,327 | 3/1986 | Nambu . |
| 4,728,754 | 3/1988 | Fowler et al. . |
| 4,755,922 | 7/1988 | Puvogel . |
| 4,796,278 | 1/1989 | Naka ........................ 375/3 |
| 4,807,109 | 2/1989 | Farrell et al. . |
| 4,825,435 | 4/1989 | Amundsen et al. . |
| 4,837,778 | 1/1989 | Trumpp ............... 178/70 R |
| 4,847,831 | 7/1989 | Spiesman et al. . |
| 4,856,023 | 8/1989 | Singh . |
| 4,866,703 | 9/1989 | Black et al. . |
| 4,872,183 | 10/1989 | Egami . |
| 4,881,244 | 11/1989 | Haug . |
| 4,888,764 | 12/1989 | Haug . |
| 4,943,976 | 7/1990 | Ishigaki . |
| 4,943,979 | 7/1990 | Webber, Jr. . |
| 4,974,143 | 11/1990 | Yamada . |
| 5,081,646 | 1/1992 | Faunce . |
| 5,097,353 | 3/1992 | Fujiwara et al. . |
| 5,115,449 | 5/1992 | Lockyer et al. . |
| 5,124,982 | 6/1992 | Kaku . |
| 5,132,987 | 7/1992 | Motohashi et al. . |
| 5,282,223 | 1/1994 | Muramatsu .................. 375/4 X |

OTHER PUBLICATIONS

IEEE, "Standard Microcontroller System Serial Control Bus Handbook", New York, Aug. 5, 1991, pp. 1-1-1-15, 10-1-10-10, 11-1-11-11, A-1-A-10.
Bent, Roland; Schnunbusch, Wolfgang; Wiele, Wolfgang, Drivecom, "Interbus-S/actuator bus for controlled drives", pp. 1-18.
"Data Networks: Concepts, Theory and Practice"; Chapter 10, The Link Layer: Concepts and Functions, pp. 342-377.
Chapter 11, "Data Link Control: standards and products", pp. 378-414.
Texas Instruments, Unit 1, "History of Networking", pp. I-1-I-22.
Texas Instruments, Unit VI, "Networking Competition", pp. VI-1-VI-14.
Texas Instruments, Unit VII, "Networking Future Developments", pp. VII-1-VII-17.
Wood, G. G., Control Engineering, vol. 2, "International Standards Emerging For Fieldous", Oct. 1988, pp. 22-25.

Primary Examiner—Stephen Chin
Assistant Examiner—Bryan E. Webst
Attorney, Agent, or Firm—Paul and Paul

[57] ABSTRACT

A repeater device in a communication network within a transmission line segment receives a distorted signal from the transmission line and retransmits a modified signal. The repeater includes a detector for activating the device in response to the input of the signal and a logic control in order for directing the signal to the modifying portion of the device. To minimize bit error which may occur as the signal is being transmitted over the network or as the signal is being received by the modifying portion of the repeater, the repeater replaces the leading bit of the signal prior to being retransmitted back to the network.

29 Claims, 7 Drawing Sheets

REPEATER FOR A DIGITAL CONTROL SYSTEM

BACKGROUND OF THE INVENTION

1. Field of the Invention

The present invention relates generally to data communication systems and more particularly to repeater devices for regenerating digital signals transmitted through an electronic digital control system.

2. Brief Description of the Prior Art

Various electronic digital control systems are known in the industry which operate to transmit data and commands in order to control a plurality of devices, such as microprocessors, valve actuators, pumps, solenoid valves, printers, memories, and the like. The data and commands which are in the form of a digital signal are transmitted between the corresponding devices over transmission lines in the control system. It is well known that when a number of devices are connected to a transmission line or if the transmission line is very long, signal degradation will occur from the resistive and capacitive effects of the line and devices upon the transmitted signal. Repeaters are oftentimes utilized in the transmission line of such control systems in order to regenerate the signal for retransmission through the system. Generally, the repeaters are required to be placed at specific intervals in the control system depending upon the desired length of transmission of the signal and rate of signal through the system. With digital signal transmission, the speed of the signal through the digital control system is inversely proportional to the distance of signal transmission, i.e., the faster the speed of the signal through the system, the shorter the transmission before signal degradation will occur. As such, many control systems which employ higher rates of signal transmission are not capable of transmitting the signal over long wiring distances without experiencing signal degradation.

There is a need for an improved repeater which will transmit data and commands over extended distances and at high rates of speed through an electronic digital control system.

SUMMARY OF THE INVENTION

The present invention provides a repeater for monitoring and modifying a digital signal transmitted through a transmission line in an electronic digital control system. The repeater of the present invention includes means for receiving the digital signal from the transmission line for input into the device. Means for modifying the digital signal input into the repeater is also included for providing a modified signal. The modifying means of the present invention includes means for reclocking the signal to provide uniform bit cell times for reshaping the signal. The modifying means also includes means for amplifying the signal in response to the reclocking means to provide the modified signal. Means for transmitting the modified signal is also included for passing the modified signal from the repeater for continued transmission through the transmission line.

Advantageously, the present invention provides a repeater capable of modifying a signal distorted by transmission through an electronic digital control system for providing a modified signal which can be retransmitted through the control system over extended distances and at high rates of speed.

It is another advantage of the present invention to provide a repeater capable of interjecting leading bits at the beginning of the signal for retransmitting a modified signal that compensates for any bits which may have been lost during transmission through the control system or which may have only been partially received by the repeater.

It is a further advantage of the present invention to provide a repeater having means for detecting a signal input into the device for activating and then deactivating the modifying of the signal and for deactivating the retransmission of the modified signal to the control system.

Furthermore, it is another advantage of the present invention to provide a repeater capable of modifying a fiber optic signal and/or an electrical signal.

It is still another advantage of the present invention to provide a repeater capable of converting an electrical signal to a fiber optic signal or a fiber optic signal to an electrical signal.

These and other objects and advantages of this invention will become more apparent when taken in consideration with the following description and the attached drawings.

DETAILED DESCRIPTION

Figure 1:
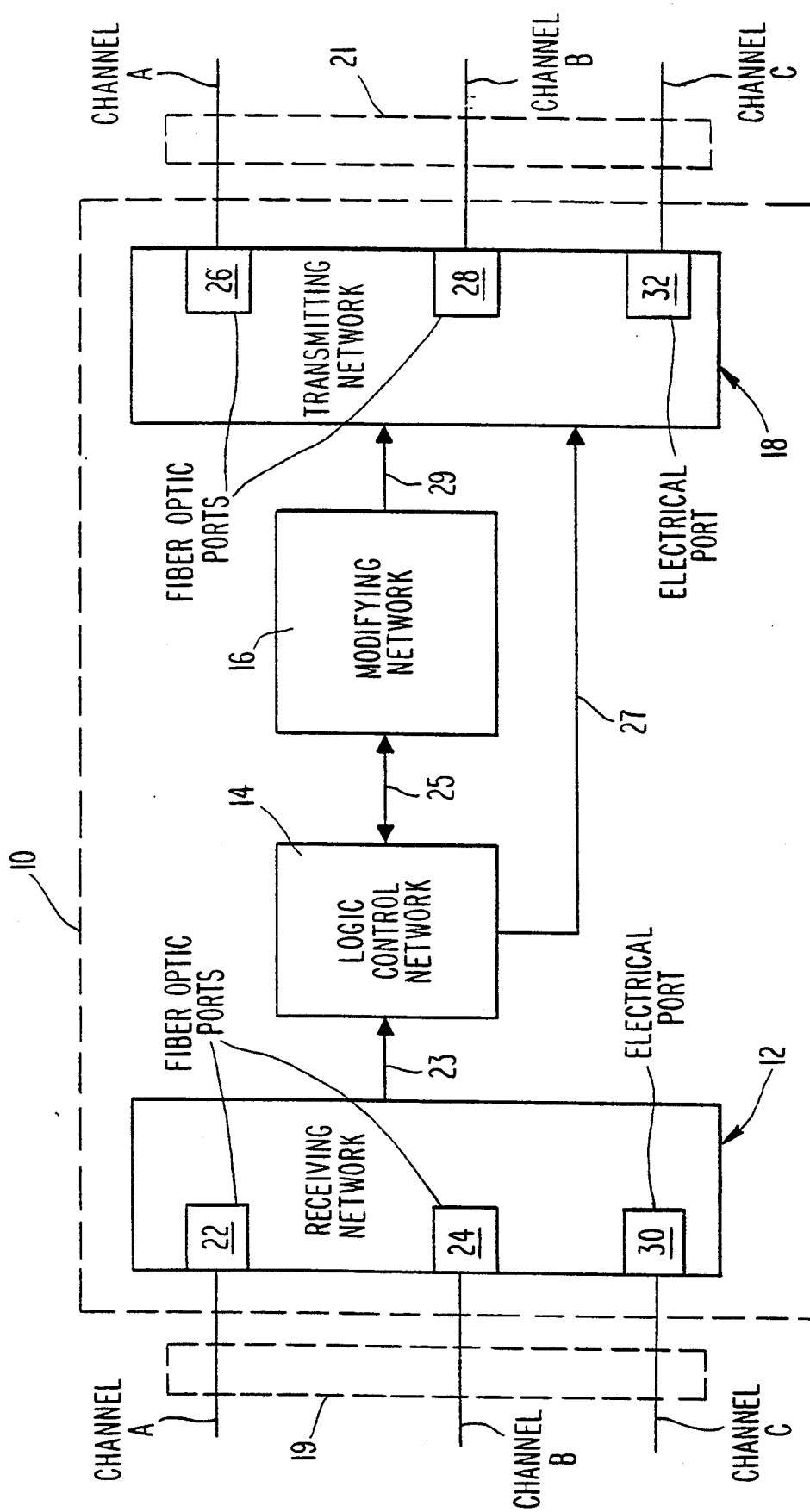
FIG. 1 is a block diagram showing a first embodiment of the present invention.

Referring now to the drawings in detail, wherein like reference numerals indicate like elements throughout the several views, there is shown in the block diagram of FIG. 1 a first perferred embodiment of a repeater 10 according to the present invention. The repeater 10 as illustrated includes means for receiving a digital signal comprising a receiving network 12, a logic control means comprising a logic control network 14, means for modifying the digital signal comprising a modifying network 16 and means for transmitting out a modified signal comprising a transmitting network 18. As shown, the receiving network 12 is connected via a line 23 to the logic control network 14. The logic control network 14 is connected via a line 25 to modifying network 16 and via a line 27 to the transmitting network 18. The modifying network 16 is also connected to the transmitting network 18 via a line 29. As previously indicated, the repeater 10 of the present invention is adapted to be used within an electronic digital control system, for example the BITBUS type as described by an IEEE-1118 specificiation. Specifically, the repeater 10 is used within the control system for extending data transmission over longer distances and at accelerated rates of speed.

The repeater 10 in operation within an electronic digital control system (not shown) is preferably positioned adjoining two segments 19, 21 of a transmission line; for example of the twisted pair type for electrical signals and fiber optic cable for optical signals. However, the repeater 10 may have other applications as well, such as being installed into a transmission line segment or in association with other devices in the control system. As described earlier, the data and commands are transmitted through the system in the form of a digital signal. The digital signal which comprises a plurality of bits is passed from a first transmission line segment 19 into the repeater 10, modified and then sent out through a second transmission line segment 21 for retransmission through the control system. As will be described in detail below, the repeater 10 modifies the digital signal in order to reduce signal distortion which will normally occur from the loading effects (both resistive and capacitive) of the control system during signal transmission; particularly when the signal passes through the individual devices in the system and the transmission line 19, 21. Signal distortion will adversely effect the transmission of a signal by decreasing both the distance and speed of signal transmission over the control system. It is the manner of signal modification carried out by the repeater of the present invention which will provide improved transmission of the signal through the control system.

The repeater 10 according to a first preferred embodiment of the present invention is specifically adapted for use in systems which employ both fiber optic and electrical signal transmission. For example, some systems which utilize fiber optic signal transmission require some or all of the devices within the system to be controlled by electrical signals. It is well known that fiber optic signal transmission is more efficient then electrical transmission as it will allow for longer transmission of a signal before distortion will occur. In such instances, the repeater, in addition to modifying the signal, will convert the fiber optic signal to an electrical signal prior to being sent to a particular device. Furthermore, the electrical signal after being sent through the particular device, can be passed back through the repeater in order to convert the signal back to a fiber optic signal for retransmision over the control system.

Figure 7:
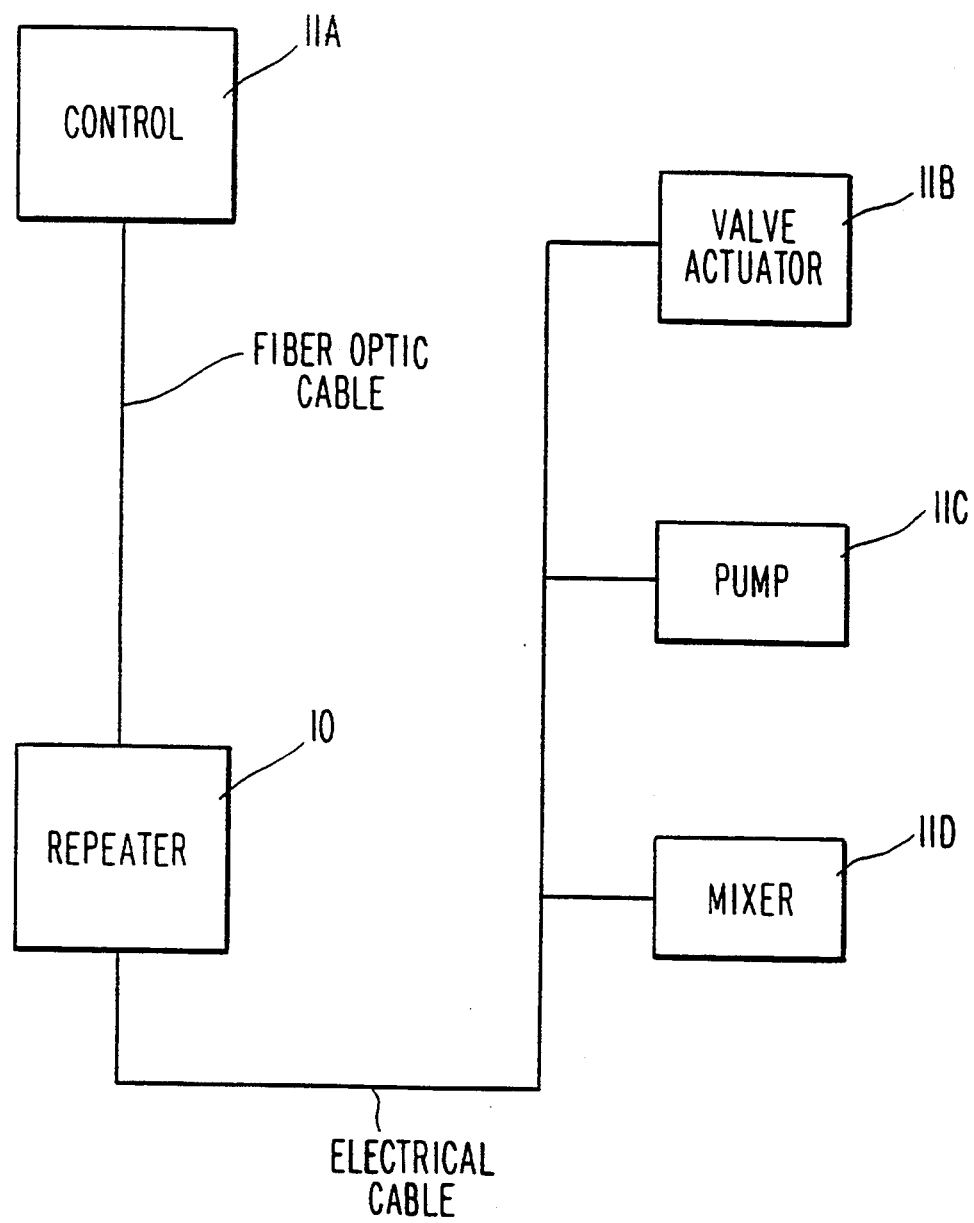
FIG. 7 is a block diagram illustrating an electronic digital control system using the repeater of FIG. 1.

In FIG. 7 is a block diagram illustrating an electronic digital control system using the repeater 10 according to the present invention to interconnect a plurality of devices comprising a control 11A, a valve actuator 11B, a pump 11C and a mixer 11D. As shown, the control 11A, such as a digital computer, is connected via a fiber optic cable to the repeater 10 which is in connection with the devices 11B through 11D via wire cable. A fiber optic signal is passed over the fiber optic cable by the control 11A and is passed through the repeater 10 which directs a modified electrical signal to the devices 11B through 11D.

It should be understood, however, that the repeater 10 can have application in other types of systems as well, for example in systems which require conversion from an electrical signal to a fiber optic signal before being sent to a particular device.

As shown in FIG. 1, the receiving and transmitting networks 12 and 18 of the repeater 10 are each provided with fiber optic and electrical signal ports for receiving and transmitting two fiber optic signals over two fiber optic channels (designated as channels A and B, respectively) and one electrical signal over one electrical channel (designated as channel C). Specifically, the receiving and transmitting networks 12 and 18 are each comprised of two fiber optic signal ports 22, 24, and 26, 28, respectively, and one electric signal port 30 and 32. By way of example, the fiber optic signal ports can comprise high speed fiber optic transmitters and receivers, models HFBR-14XX and HFBR-24XX, respectively, manufactured by Hewlett-Packard, and the electrical signal port can be a RS-485 transceiver, manufactured by National Semiconductor.

In operation of the repeater 10, an electrical signal transmission is received into the device via the electrical signal port 30, modified and then transmitted out via one or both of the fiber optic signal ports 26 and/or 28. Alternatively, a fiber optic signal transmission is received into one of the fiber optic signal ports 22 or 24, modified and then transmitted out via the electrical signal port 32.

As illustrated, the repeater 10 receives only one signal transmission into the device at any one time. Preferably, the digital control system is configured in a primary/secondary or "master-slave" type arrangement which will only transmit over one channel into the repeater at any one time. However, other methods may also be utilized for this same purpose.

Reference is now directed to FIG. 1. As described earlier, the signal after being received through the appropriate signal port is then modified by the repeater 10. Preferably, a logic control network 14 is included for directing the signal from the receiving network 12 to the modifying network 16 of the device. Similarly, the signal after being modified is preferably directed by the logic control network 14 to the signal transmitting network 18 for transmission from the device.

It should be understood, however, that the signal may be sent directly from the receiving network 12 to the modifying network 16 and/or from the modifying network 16 directly to the transmitting network 18 for transmission from the device.

Figure 3:
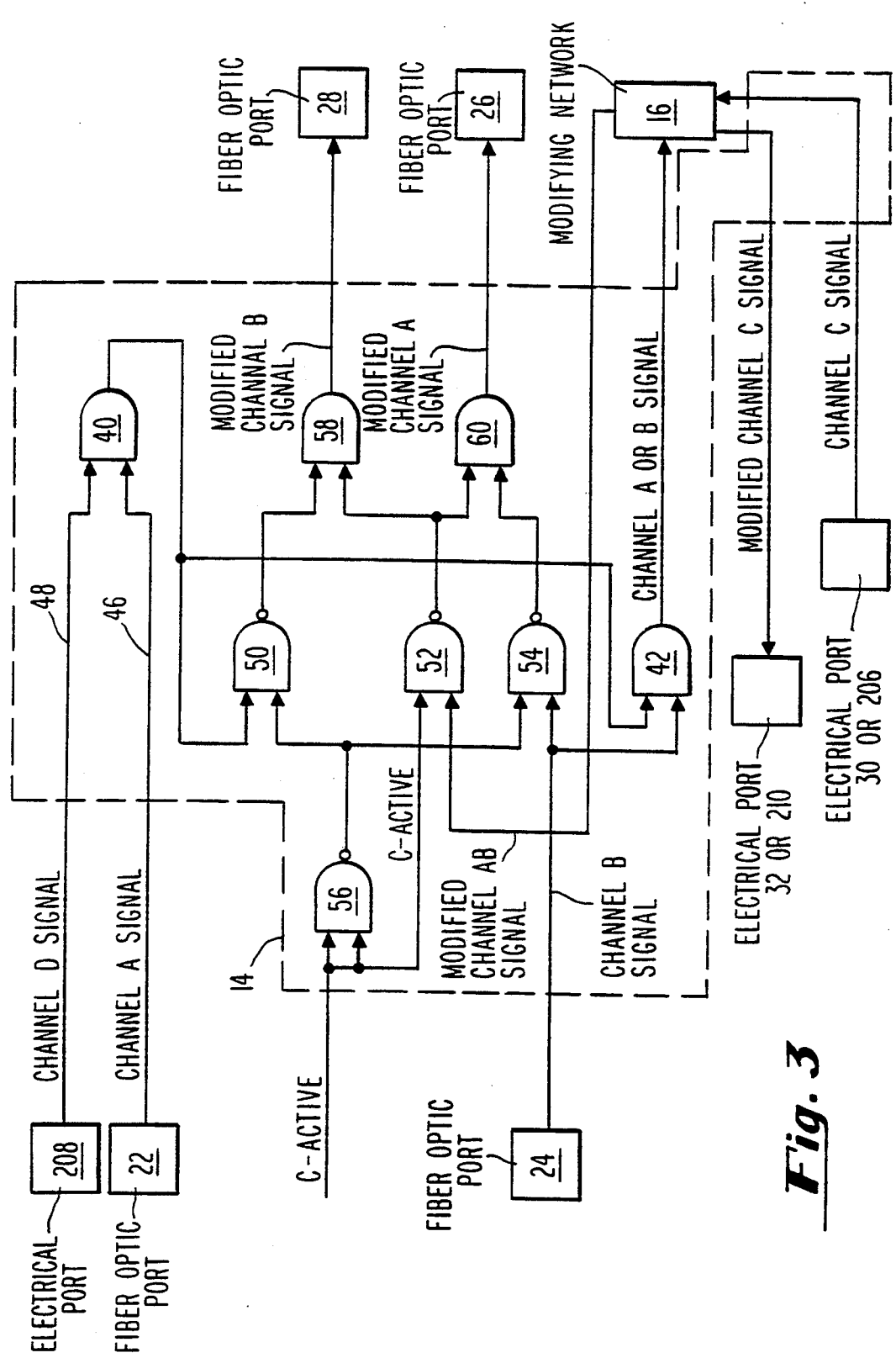
FIG. 3 is a diagram showing the logic control network of FIGS. 1 and 2 in more detail.

In FIG. 3 is illustrated in more detail the preferred structure of the logic control network 14 according to the present invention, although any suitable structure may be employed for the same purpose. In operation of the logic control network 14, AND gates 40, 42 direct the signal received on one of two fiber optic ports 22, 24 in the first embodiment to the modifying portion 16 of the device 10. As shown, the AND gate 40 includes two input lines 46 and 48. The input line 46 of the AND gate 40 is in connection with the fiber optic signal port 22 for receiving a first fiber optic signal being transmitted over channel A. The output of the AND gate 40 is then passed to an input of an AND gate 42. The AND gate 42 includes a second input which is connected to the fiber optic signal port 24 for receiving a second fiber optic signal being transmitted over channel B. The output of the AND gate 42 passes the signal to the modifying network 16 of the device 10. As illustrated in FIG. 3, the channel C signal received through the electrical signal port 30 is passed directly to the modifying network 16 of the repeater 10.

The repeater 10 of the present invention also detects an incoming signal as it is being input into the device. Preferably, when the digital control system is in an idle condition (no signals) the receiving network 12 will output a logic one which will place the repeater 10 in an inactive state. When the repeater 10 is in inactive state, each of the signal ports 22, 24 and 30 are in a ready condition in order to receive the next incoming signal. In the operation of the repeater 10, a DC signal (preferably 0.4 volts) is placed by the digital control system on the electrical channel C and into the electrical signal port 30, while the fiber optic signal ports 22, 24 output a logic one through the operation of a pull-up resistor (not shown) when the system is in an idle condition or if the signal ports 22, 24 are not in operation. As a signal is input into the repeater 10, the idle condition (logic one) is changed to a logic zero indicating that an active signal is coming into a respective signal port, and then will be passed to the modifying network 16 of the device 10.

As explained previously, the signal after being modified is preferably directed back through the logic control network 14 and sent to the appropriate transmitting signal port to be transmitted out to the transmission line segment 21. In FIG. 3 are NAND gates 50, 52, 54, and 56 in connection with AND gates 58 and 60 which direct the modified signal originally input through the electrical signal port 30 to the fiber optic signal ports 26 and 28, respectively. Specifically, the NAND gate 56 receives a C-active input from the modifying network 16 (which indicates that an electrical signal received over channel C is being modified by the repeater 10) and outputs to the NAND gates 50 and 54. The first NAND gate 50 receives the output from the AND gate 40 and outputs to the AND gate 58. The NAND gate 54 receives the fiber optic signal port 24, in addition to the C-active signal, and outputs to the AND gate 60. The NAND gate 52 receives the C-active signal and modified signal and outputs to both the AND gates 58 and 60. The AND gate 58 outputs to the fiber optic transmitting port 28 while the AND gate 60 outputs to the other fiber optic transmitting port 26.

The C-active signal, shown connected to the NAND gates 56 and 52, is responsive to the operation of the modifying network 16, as will be described in detail below. Preferably, the C-active signal is in a high state (logic one) whenever the C channel signal is being modified by the modifying network 16; otherwise the C-active signal is in a low state condition (logic zero). As shown, the C-active signal when in its high state enables the modified signal to pass through the logic control network 14 for output over both the fiber optic ports 26 and 28, respectively. Alternatively, it would be possible to limit the transmission of the modified signal to the fiber optic ports 26 or 28 individually, if desired.

As described earlier, a signal input into the fiber optic ports 22 or 24, after being modified, will be transmitted out via the electrical signal port 32. As shown in FIG. 3, this modified signal will pass from the modifying network 16 of the device 10, via the logic control network 14, directly to the electrical signal port 32 for transmission from the repeater 10.

Figure 4:
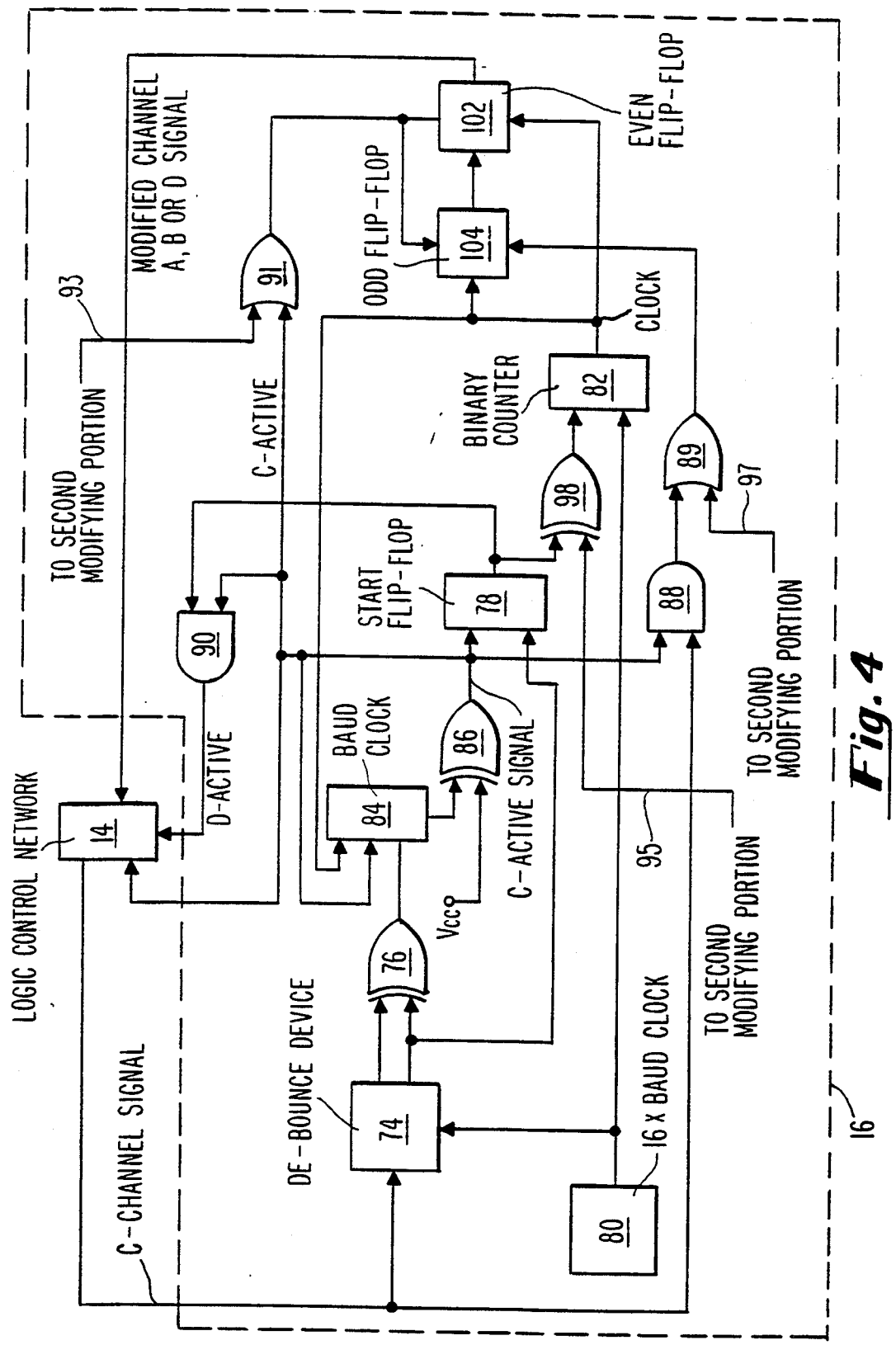
FIG. 4 is a diagram showing the modifying network of FIGS. 1 and 2 in more detail.

In FIG. 4, the diagram of the structure of the modifying network 16 of the device 10 is illustrated. The signal modifying network 16 consists of two identical portions; the first portion modifying channel C signals and the second portion modifying channels A, B or D signals, respectively. As the two portions are identical, only the first portion is shown and will be described herein. The modifying network 16 as shown includes means for reclocking the digital signal for providing uniform bit cell times for reshaping the signal and also means for amplifying the signal in response to the reclocking means to provide a modified signal. As illustrated, the channel C signal is input from the logic control network 14 to a de-bounce device 74, the output of which is passed to an exclusive OR gate 76 and a start flip-flop 78. A clocking means comprising a 16× baud clock 80, preferably operating at one mega-hertz, is provided which inputs into the de-bounce device 74 and also into a counting means comprising a presettable binary counter 82. The output from the exclusive OR gate 76 is provided to the input of a baud clock 84, which output is passed to another exclusive OR gate 86. The output of the exclusive OR gate 86 provides the C-active signal which is passed to the logic control network 14 described above, the baud clock 84, the start flip-flop 78, AND gates 88 and 90, and an OR gate 91. The OR gate 91, in turn, outputs to first and second storage means comprising odd and even bit flip-flops 104 and 102, respectively, preferably of the D flip-flop type. The 16× baud clock 80, the binary counter 82 and the odd bit flip-flop 104, together comprise the reclocking means recited above. The AND gate 88, in addition to receiving the C-active signal, receives the channel C signal and outputs to an OR gate 89. The OR gate 89, in addition to receiving the output of the AND gate 88, receives a corresponding AND gate output via a line 97 from the second portion of the modifying network 16, and outputs to the odd flip-flop 104. The start flip-flop 78 outputs to an OR gate 98 which outputs to the binary counter 82 and also outputs to the AND gate 90. The OR gate 98 receives a corresponding start flip-flop output from the second portion of the modifying network 16 via a line 95. The binary counter 82 outputs to the odd bit flip-flop 104, the even bit flip-flop 102, and the baud clock 84. The output of the odd bit flip-flop 104 is input to the even flip-flop 102. The combination of the odd bit flip-flop 104 and the even bit flip-flop 102 comprise the amplifying means recited above. The transfer of the signal from the odd flip-flop 104 to the even flip-flop 102 amplifies the signal. The output of the even flip-flop 102 is then transmitted through the logic control network 14 to the respective signal port 26, 28 and out to the transmission line 21.

While the modifying network 16 is described in detail above including the first and the second storage means (the odd and even bit flip-flops 104 and 102, respectively), it should be understood that any number of storage means can be provided for this same purpose. For example, a third storage means comprising a flip-flop (not shown) can be included for receiving the output of the OR gate 91, the OR gate 89 and the binary counter 82 for outputting to the odd bit flip-flop 104.

Figure 5:
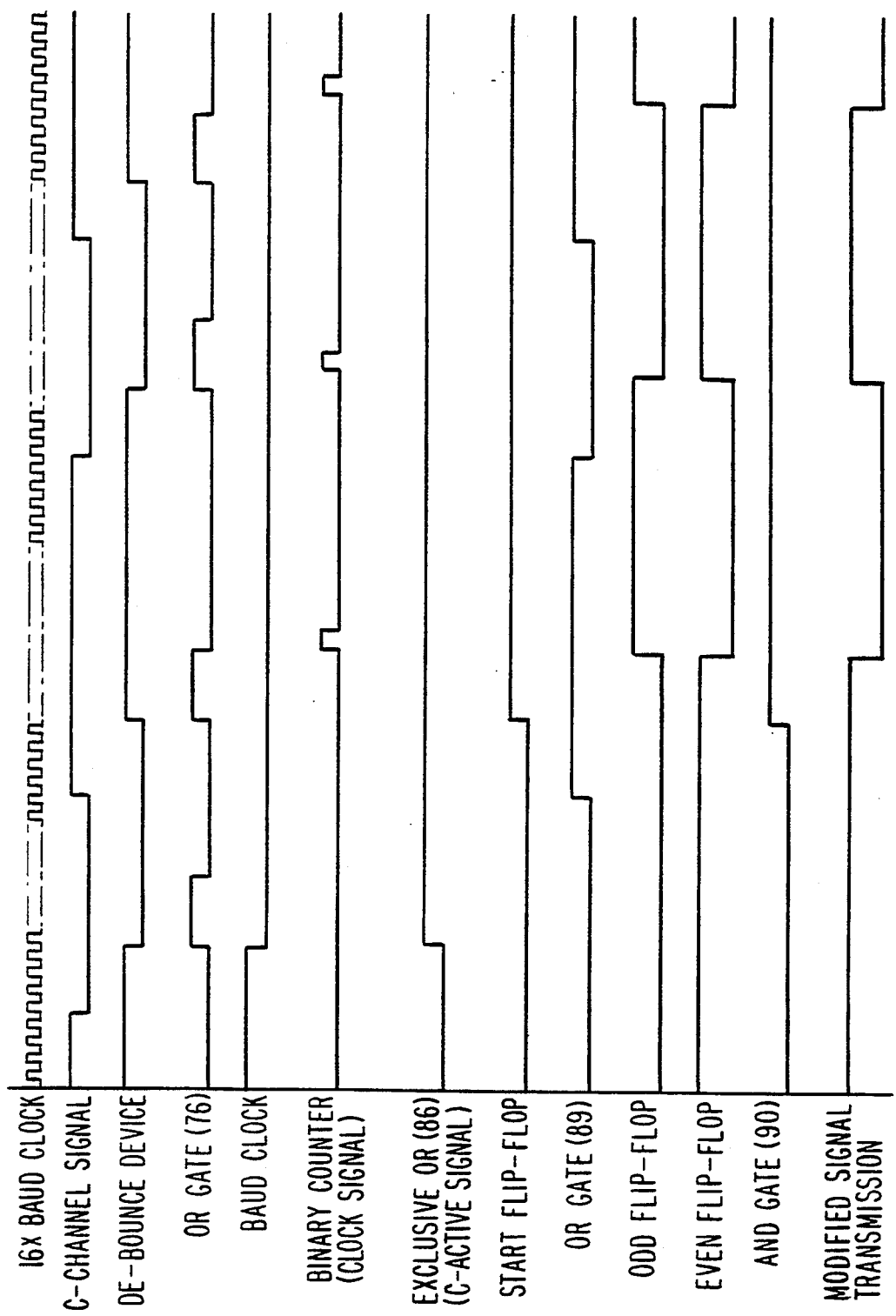
FIG. 5 is a timing diagram showing operation of the modifying network of FIG. 4.

FIG. 5 is a timing diagram of the signals within the modifying network 16 during operation of the repeater 10. The modifying network 16 of the repeater 10 is provided with means for detecting the digital signal for activating the binary counter 82 for operating the modifying network 16. As previously described, an idle condition (logic one) changes to a logic zero indicating that an active signal is entering through a respective channel. The de-bounce device 74 detects a signal change and produces an identical signal preferably four clock ticks later. The output of the de-bounce device 74 is connected to the exclusive OR gate 76 which produces a reset pulse to the baud clock 84. The baud clock 84 off state forces the output of the exclusive OR gate 86 to equal one; this is the C-active signal identified above. The next incoming signal change will return the incoming signal to a logic one (idle condition). As this positive going pulse appears on the output of the de-bounce device 74, the start flip-flop 78 is turned on and produces a high output (logic one). In this state, the output of the OR gate 98 is a logic one which removes a load signal from the binary counter 82. The binary counter 82 at this time begins to count from its preset number up to 15 and at 15 produces an output labeled CLOCK. In the preferred embodiment, the preset number is set at 11, however it may be set at different values, if desired, for the same purpose. The binary counter 82 is adapted to count from zero to 15 to produce this output every 16 pulses of the 16× baud clock 80. Since the 16× baud clock 80 operates at one mega-hertz; the CLOCK operation is at 62.5 kilohertz. The CLOCK output is used to control the output of the data signal in order to provide uniform bit cell times for the signal corresponding with the clock pulses. The odd flip-flop 104 is reset to a logic zero and the even flip-flop 102 is preset to a logic one by the signal output from the OR gate 91. As described earlier, the output of the odd flip-flop 104 is the input to the even flip-flop 102 for providing the amplication of the signal. A means for interjecting leading bits to a beginning of the signal is included for a purpose described below. The first CLOCK pulse will shift the logic zero from the odd flip-flop 104 to the even flip-flop 102, and the data signal from the OR gate 89 to the odd flip-flop 104. The logic zero from the odd flip-flop 104 is interjected at the beginning of the message, replacing the logic zero of the original signal. The logic zero replacement compensates for any loss of the signal which may have occured during signal transmission, or which may have only been partially received by the modifying network 16. As described earlier, the output of the even flip-flop 102 is then output to the respective signal port where the modified signal is transmitted out to the transmission line 21.

It should be understood, however, that any number of storage means can be provided for replacing the leading bit of the signal without departing from the spirit of the invention. For example, a fourth storage means comprising a flip-flop (not shown) can be included in connection with the OR gate 89 and the OR gate 91 in order for interjecting the leading bit to the signal. Furthermore, it should be understood that any type or number of bits can be replaced for this same purpose. For example, the modifying network 16 can be adapted for replacing a logic one at the beginning of the message or can be adapted for replacing more than one leading bit through use of a plurality of storage means.

The preceding procedure is repeated until the end of the message is detected by the device 10. Accordingly, the repeater 10 is provided with means for deactivating both the modifying network 16 and the transmitting network 18 at termination of the signal transmission. The end of the message is detected by the combination of the de-bounce device 74 and the baud clock 84. As indicated above, any change in the signal will produce a reset pulse from the exclusive OR gate 76 to the baud clock 84. When the signal does not change, the baud clock 84 will count to a predetermined number, preferably the number 8, and will then produce an output to the exclusive OR gate 86 which will change the C-active signal from a logic one to a logic zero. This, in turn, will shut off the start flip-flop 78, stop the binary counter 82 and turn off the signal ports 26, 28, thus deactivating the repeater 10. The repeater 10 then returns to its idle condition with the receiving network 12 in a waiting condition for the next signal to be input into the repeater 10.

Figure 2:
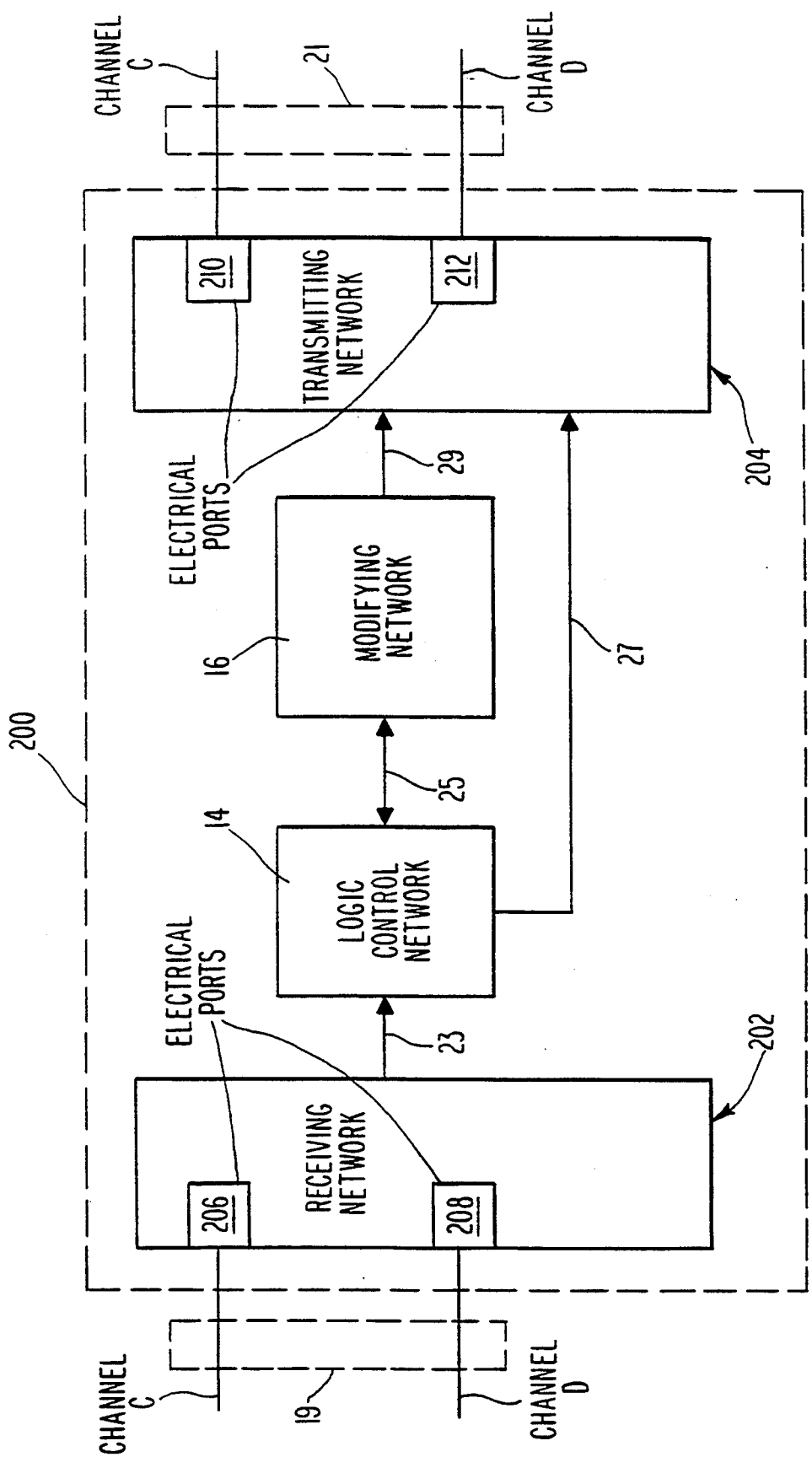
FIG. 2 is a block diagram showing a second embodiment of the present invention.

In FIG. 2 is illustrated a second preferred embodiment of the repeater according to the present invention. This repeater 200 is adapted for use exclusively with electrical signals, as will be described below. As shown, the repeater 200 is provided with receiving and transmitting networks 202 and 204 comprising two electrical signal ports 206, 208 and 210, 212, respectively, for receiving and transmitting two electrical signals over two electrical channels (designated as channels C and D). Similar to that described above, in the operation of the repeater 200, an electrical signal transmission is received into the device via the electrical signal port 206, modified and then transmitted out via the other electrical signal port 212. Accordingly, a signal received on the electrical signal port 208 will be transmitted out via electrical signal port 210.

The logic control network 14 as shown in FIG. 3 is also adapted for use with the repeater 200 of the present invention. In this second embodiment, the lead 46 is shown in connection with the electrical signal port 208 for receiving an electrical signal over channel D, while the fiber optic signal ports 22, 24 and 26, 28 are left unconnected. Similar to the first embodiment, the channel C signal received through the electrical signal port 206 is passed via the logic control network 14 directly to the modifying network 16.

As shown in the diagrams of FIGS. 3 through 5, the modifying network 16 is also adapted for use with the repeater 200. As illustrated in FIG. 4, the AND gate 90, which receives the C-active signal, outputs to the logic control network 14 for activating the electrical signal port 212 (not shown) when the modified signal to be transmitted from the repeater 200 is a channel D signal. A corresponding AND gate is included in the second portion of the modifying network 16, which is connected to the OR gate 91 via a line 93, for activating the electrical signal port 210 shown in FIG. 3 (or 32 in the first embodiment) when the modified signal to be transmitted is a channel C signal.

Figure 6:
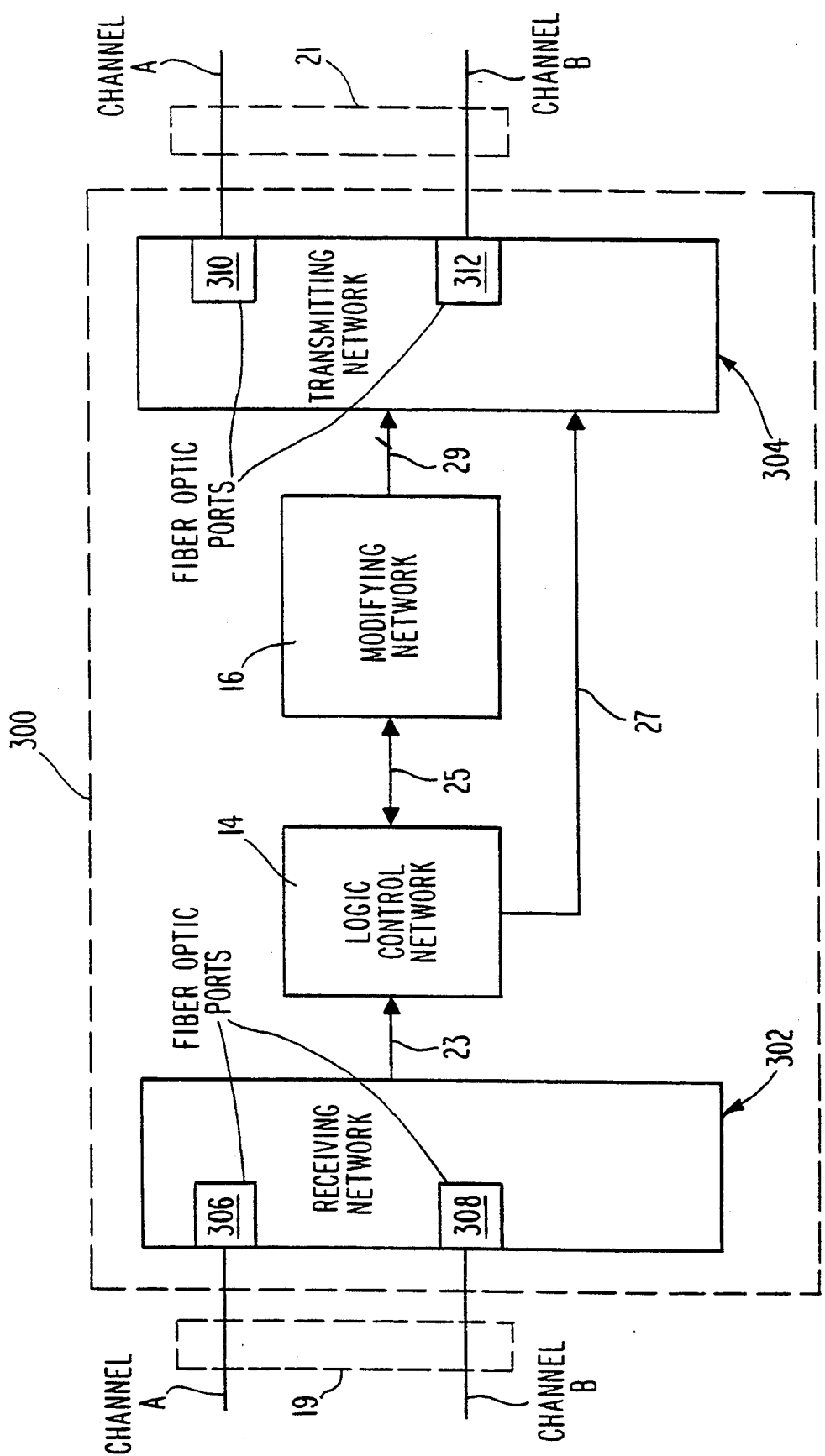
FIG. 6 is a block diagram showing a third embodiment of the present invention.

In FIG. 6 is shown a third preferred embodiment of the present invention. The repeater 300 according to this third embodiment is adapted to be used exclusively with fiber optic signals. This repeater 300 includes a receiving network 302 and a transmitting network 304, with each comprising two fiber optic signal ports 306, 308 and 310, 312, respectively, for receiving and transmitting two fiber optic signals over two fiber optic channels (designated as channels A and B). Similar to that described above, the repeater 300 will receive a fiber optic signal on either one of the two fiber optic receiving ports 306 or 308 and will then transmit a modified signal out of one or both of the corresponding fiber optic transmitting ports 310, 312. The logic control network 14 and modifying network 16 will operate in the same manner as that described above.

While the above three embodiments are each described comprising the aforementioned array of signal ports, it should be understood that any particular type, number or combinations of signal ports may be provided for such purpose without departing from the spirit of the invention. For example, with reference to the first embodiment, it would be possible to provide more than one electrical signal port and/or more or less than two fiber optic signal ports for performing this same purpose. Similarly, the same would apply with reference to the second and third embodiments.

It will be recognized by those skilled in the art that changes may be made by the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

We claim:

1. A repeater adapted to be used in an electronic digital control network for monitoring and modifying a digital signal being transmitted through a transmission line in the network, the repeater comprising:

means for receiving the digital signal transmitted through the transmission line for input into the repeater;

means for modifying the digital signal input from the receiving means for providing a modified signal, the modifying means including means for reclocking the digital signal to provide uniform bit cell times for reshaping the digital signal and means for amplifying the signal in response to the reclocking means to provide the modified signal; and means for transmitting the modified signal out from the repeater for continued transmission through the transmission line;

wherein the reclocking means comprises:

clocking means for providing a series of clock pulses;

counting means responsive to the clocking means, the counting means being adapted for producing an output after a predetermined number of clock pulses of the clocking means; and a first storage means having at least a first input and a second input, the output of the counting means being fed to the first input of the first storage means and the digital signal being fed to the second input of the first storage means when the output of the counting means is fed to the first input of the first storage means.

2. A repeater according to claim 1, wherein the clocking means comprises a clock generator, the counting means comprises a presetable binary counter and the first storage means comprises a D-type flip-flop.

3. A repeater according to claim 1, wherein the amplifying means comprises:

a second storage means connected to the first storage means, the second storage means including at least a first input and a second input, the first input of the second storage means being adapted to receive the output of the counting means, the digital signal being fed from the first storage means to the second input of the second storage means when the output of the counting means is fed to the first input of the first storage means and the first input of the second storage means.

4. A repeater according to claim 3, wherein the second storage means comprises a D-type flip-flop.

5. A repeater according to claim 3, wherein the modifying means further includes means for interjecting leading bits to a beginning of the signal for compensating for any bits which may have been lost during transmission or which may have been only partially received by the modifying means.

6. A repeater according to claim 5, wherein the means for interjecting leading bits comprises at least the first storage means adapted for being programmed with at least one leading bit, the at least one leading bit being interjected at the beginning of the digital signal when the output of the counting means and the digital signal are received by the first and second inputs of the first storage means, respectively.

7. A repeater according to claim 6, wherein the first storage means comprises a D-type flip-flop adapted for being reset to a logic zero and preset to a logic one.

8. A repeater according to claim 5, wherein the modifying means further includes means for detecting the digital signal for activating the counting means for operating the modifying means.

9. A repeater according to claim 8, wherein the detecting means further includes means for deactivating both the modifying means and the transmitting means at termination of signal transmission.

10. A repeater according to claim 8, further including logic control means for directing the signal from the receiving means to the modifying means and for directing the modified signal from the modifying means to the transmitting means.

11. A repeater according to claim 10, wherein the receiving means and transmitting means are in connection with at least one channel.

12. A repeater according to claim 11, wherein the receiving means and transmitting means are in connection with at least one fiber optic channel and at least one electric channel, the signal being received over only one of the channels at any one time.

13. A repeater according to claim 12, wherein the signal is received over an electric channel and the modified signal is transmitted out over at least one fiber optic channel.

14. A repeater according to claim 12, wherein the signal is received over a fiber optic channel and the modified signal is transmitted out over at least one electric channel.

15. A repeater according to claim 11, wherein the receiving means and transmitting means are in connection with at least two electric channels, the signal being received over only one of the channels at any one time.

16. A repeater according to claim 15, wherein the signal is received over an electric channel and the modified signal is transmitted out over at least one electric channel.

17. A repeater according to claim 11, wherein the receiving means and transmitting means are in connection with at least two fiber optic channels, the signal being received over only one of the channels at any one time.

18. A repeater according to claim 17, wherein the signal is received over a fiber optic channel and the modified signal is transmitted out over at least one fiber optic channel.

19. A repeater adapted to be used in an electronic digital control network for monitoring and modifying a digital signal being transmitted through a transmission line in the network, the repeater comprising:

means for receiving the digital signal transmitted through the transmission line for input into the repeater;

means for modifying the digital signal input from the receiving means for providing a modified signal, the modifying means including means for reclocking the digital signal to provide uniform bit cell times for reshaping the digital signal and means for amplifying the signal in response to the reclocking means to provide the modified signal, wherein the reclocking means comprises:

clocking means for providing a series of clock pulses;

counting means responsive to the clocking means, the counting means being adapted for producing an output after a predetermined number of clock pulses of the clocking means; and a first storage means having at least a first input and a second input, the output of the counting means being fed to the first input of the first storage means and the digital signal being fed to the second input of the first storage means when the output of the counting means is fed to the first input of the first storage means, wherein the amplifying means comprises:

a second storage means connected to the first storage means, the second storage means including at least a first input and a second input, the first input of the second storage means being adapted to receive the output of the counting means, the digital signal being fed from the first storage means to the second input of the second storage means when the output of the counting means is fed to the first input of the first storage means and the first input of the second storage means, means for interjecting leading bits to a beginning of the signal for compensating for any bits which may have been lost during transmission or which may have been only partially received by the modifying means, wherein the means for interjecting leading bits comprises at least the first storage means adapted for being programmed with at least one leading bit, the at least one leading bit being interjected at the beginning of the digital signal when the output of the counting means and the digital signal are received by the first and second inputs of the first storage means, respectively, means for detecting the digital signal for activating the counting means for operating the modifying means, the detecting means further including means for deactivating both the modifying means and the transmitting means at termination of signal transmission, and logic control means for directing the signal from the receiving means to the modifying means and for directing the modified signal from the modifying means to the transmitting means; and means for transmitting the modified signal out from the repeater for continued transmission through the transmission line, wherein the receiving means and transmitting means are in connection with at least one channel.

20. A repeater according to claim 19, wherein the clocking means comprises a clock generator, the counting means comprises a presetable binary counter and the first storage means comprises a D-type flip-flop.

21. A repeater according to claim 19, wherein the first storage means and the second storage means comprise D-type flip-flops.

22. A repeater according to claim 19, wherein the first storage means comprises a D-type flip-flop adapted for being reset to a logic zero and preset to a logic one.

23. A repeater according to claim 19, wherein the receiving means and transmitting means are in connection with at least one fiber optic channel and at least one electric channel, the signal being received over only one of the channels at any one time.

24. A repeater according to claim 23, wherein the signal is received over an electric channel and the modified signal is transmitted out over at least one fiber optic channel.

25. A repeater according to claim 23, wherein the signal is received over a fiber optic channel and the modified signal is transmitted out over at least one electric channel.

26. A repeater according to claim 19, wherein the receiving means and transmitting means are in connection with at least two electric channels, the signal being received over only one of the channels at any one time.

27. A repeater according to claim 26, wherein the signal is received over an electric channel and the modified signal is transmitted out over at least one electric channel.

28. A repeater according to claim 19, wherein the receiving means and transmitting means are in connection with at least two fiber optic channels, the signal being received over only one of the channels at any one time.

29. A repeater according to claim 28, wherein the signal is received over a fiber optic channel and the modified signal is transmitted out over at least one fiber optic channel.

* * * * *